ary Examiner—Josephine Barr
United States Patent [19]

Maeno et al.

[11] Patent Number: 4,830,779
[45] Date of Patent: May 16, 1989

[54] ELECTRICALLY CONDUCTIVE RESIN COMPOSITION

[75] Inventors: Seiji Maeno, Tokyo; Hidetaka Ozaki, Yachiyo; Hisashi Yamada, Chiba, all of Japan

[73] Assignee: Lion Corporation, Tokyo, Japan

[21] Appl. No.: 134,386

[22] Filed: Dec. 17, 1987

[30] Foreign Application Priority Data

Dec. 27, 1986 [JP] Japan ............................ 61-313014

[51] Int. Cl.$^4$ ............................................. H01B 1/06
[52] U.S. Cl. ..................................... 252/512; 252/513; 252/518; 252/500; 252/521; 523/137; 523/451; 523/457; 523/458; 523/459; 524/123; 524/124; 524/125; 524/439; 524/440; 524/441; 524/385; 524/386; 524/379
[58] Field of Search ............... 252/512, 513, 518, 500, 252/521; 524/123, 124, 125, 439, 440, 441, 236, 248, 249, 385, 386, 379, 366; 523/137, 457–459, 451, 452

[56] References Cited

U.S. PATENT DOCUMENTS

| | | | |
|---|---|---|---|
| 4,147,669 | 4/1979 | Kleiner et al. | 252/512 |
| 4,490,283 | 4/1984 | Shakeen et al. | 252/512 |
| 4,747,966 | 5/1988 | Maeno et al. | 252/512 |

*Primary Examiner*—Josephine Barr
*Attorney, Agent, or Firm*—Armstrong, Nikaido, Marmelstein, Kubovcik & Murray

[57] ABSTRACT

An electrically conductive resin composition comprising:
(i) a resin;
(ii) a metallic powder;
(iii) a diphosphonic acid derivative; and
(iv) a hydroxyl-containing compound; wherein the weight ratio of the compound (i)/the component (ii) is 30/70 to 85/15 and the amounts of the components (iii) and (iv) are 0.5 parts by weight or more and 0.08 parts by weight, respectively, based on 100 parts by weight of the components (i) and (ii).

9 Claims, No Drawings

ELECTRICALLY CONDUCTIVE RESIN COMPOSITION

BACKGROUND OF THE INVENTION

1. Field of the Invention

The present invention relates to an electrically conductive resin composition containing metallic powder, as a main electrically conductive material, capable of exhibiting good electrical conductivity and stable electrical conductivity for a long term even at a low content of the metallic powder.

2. Description of the Related Art

Recently, remarkable developments have been made in various electronic devices or equipment such as computers, VTR, audio devices, home electric appliances, and word processors, but these electronic devices have disadvantages in that erroneous actuation can occur due to electromagnetic waves from the outside, since the electric current used therein is very small because of the use of highly integrated electronic circuits and elements.

Various plastic molded articles are widely used as housings of the above-mentioned electronic appliances because of the need for light weight articles, cost-reduction, and mass production. Plastic molded articles do not provide a shielding effect against electromagnetic waves and, therefore, the electromagnetic wave is transmitted through the plastic molded articles. Thus, the above-mentioned disadvantages cannot be solved by these plastic molded articles.

Various attempts have been made to provide plastic molded articles with shielding effects against electromagnetic waves (i.e., electromagnetic wave shielding properties). For example, electrically conductive resin compositions containing metallic powders uniformly incorporated thereinto have been proposed. The amounts of the metallic powders contained in the electrically conductive resin compositions should be reduced in view of the specific gravity, cost, and mold processing properties of the electrically conductive resin compositions, but, when metallic powders such as copper fine powders are used, the desired sufficient electrical conductivity and electromagnetic wave shielding properties cannot be obtained unless 80% by weight, based on the total amount of the resin, of the copper powders are contained therein. When the resin is polypropylene having a specific gravity of 0.91 g/cm$^3$, the specific gravity of the resultant resin composition is heavy, for example, 3.2 g/cm$^3$, and the mold processing becomes difficult so that the use of practical plastic molding processes such as injection molding processes becomes unpractical.

The use of powders of inexpensive metals other than the noble metals, such as nickel, copper, iron, and aluminum, as an electrically conductive material, is preferable in view of the low cost thereof. However, since these metallic powders are susceptible to oxidization in the resin compositions, an electrically non-conductive oxide layer will form on the surface thereof and, therefore, the electrical conductivity and the electromagnetic wave shielding properties are reduced with the lapse of time. Thus, practically satisfactory products have not been obtained as yet.

SUMMARY OF THE INVENTION

Accordingly, the objects of the present invention are to eliminate the above-mentioned problems in the prior art and to provide an electrically conductive resin composition having an excellent electrical conductivity and electromagnetic wave shielding properties as well as a long-term electrical conductivity retention, without using expensive noble metals, even at a reduced addition amount of the metallic powder.

Other objects and the advantages of the present invention will be apparent from the following description.

In accordance with the present invention, there is provided an electrically conductive resin composition comprising:
(i) a resin;
(ii) a metallic powder;
(iii) a diphosphonic acid derivative; and
(iv) a hydroxyl-containing compound;
wherein the weight ratio of the component (i)/the component (ii) is 30/70 to 85/15, the amount of the component (iii) is 0.5 parts by weight or more, and the amount of the component (iv) is 0.08 parts by weight, both based on 100 parts by weight of the components (i) and (ii).

DESCRIPTION OF THE PREFERRED EMBODIMENT

The present inventors previously found that the diphosphonic acid derivatives can improve the electrical conductivity and anti-oxidation stability of metallic powders as disclosed in U.S. Ser. No. 913,195. The present inventors have carried out further studies into this phenomenon and, as a result, have found that, when hydroxyl-containing compounds (i.e., compounds having a hydroxyl group) are used in combination with the diphosphonic acid derivatives in the electrically conductive resin compositions, the desired electrically conductive resin composition have an excellent electrical conductivity and a stable long-term electrical conductivity retention even at a reduced addition amount of the metallic powder.

The resins, metallic powders, diphosphonic acid derivatives, and hydroxyl-containing compounds usable in the present invention will now be explained in detail.

(i) Resins

The resins usable in the present invention can be any of the conventional resins, without any limitation, which are appropriately selected depending upon the intended use of the resultant electrically conductive thermoplastic resin composition. Typical examples of such resins are thermoplastic resins such as low-density polyethylene, high-density polyethylene, linear low-density polyethylene, polypropylene, polystyrene, ethylene vinyl acetate copolymer, acrylonitrile butadiene styrene (ABS) resin, methyl methacrylate (MMA) resin, ethylene-acrylate copolymer (e.g., ethylene ethylacrylate (EEA) resin), polyamide resin (e.g., nylon resin), and polyester resin and thermosetting resins such as phenol resin, unsaturated polyester resin, epoxy resin, urethane resin, and alkyd resin. These resins can be used alone or in any mixture thereof. As mentioned above, the resin is suitably contained in an amount of 30% to 85% by weight, preferably 30% to 80% by weight, based on the total amount of the resin and the metallic powder in the present electrically conductive resin composition.

(ii) Metallic Powder

The metallic powder usable in the present invention is the powder of metals and the alloys thereof subject to oxidation, when allowed to stand in air for extended periods, and thus forming oxide layers on the surfaces thereof. Such metals are those other than the noble metals (e.g., gold and silver), which are not substantially oxidized under ambient conditions. Typical examples of such metals and the alloys thereof usable in the present invention are base metals such as nickel, copper, iron, aluminum, and the alloys thereof. These metals and alloys can be used alone or in any mixture thereof.

The metallic powder can be in any shape including, in addition to finely divided granular powder, a fibrous powder and a thin flake powder. For example, in the case of a granular powder, powder having a size of 150 meshes or less, preferably 200 mesh or less in terms of Tyler mesh, is preferably used in the present invention. In the case of a fibrous powder, powder having an individual fiber diameter of 100 μm or less and a length of approximately 5 mm or less is preferably used in the present invention.

The amount of metallic powder in the present electrically conductive composition is suitably 15% to 70% by weight, preferably 20% to 70% by weight, based on the total amount of the resin and the metallic powder in the composition.

(iii) Diphosphonic Acid Derivative

The diphosphonic acid derivatives usable in the present invention are those having the above-mentioned formula (I), wherein $R^1$ is an alkyl group such as those having 1 to 18 carbon atoms or an aryl or alkylaryl group such as a phenyl group or a substituted phenyl group, e.g., an alkylphenyl group having an alkyl group with 1 to 8 carbon atoms, and $M^1$ to $M^4$ are hydrogen or cations. $M^1$ to $M^4$ may be the same or different from each other. The cations may be inorganic and organic cations. Examples of such cations are the cations of alkali metals such as sodium and potassium, the cations of alkaline earth metals such as magnesium and calcium, and ammonium cations represented by the formula $N(R^3)_4$. In the formula $N(R^3)_4$, $R^3$ independently represents hydrogen, an alkyl group having 1 to 22 carbon atoms or an aryl group having 6 to 14 carbon atoms, or a substituted alkyl or aryl group such as those substituted with a halogen atom, a hydroxyl group, an amino group, an amido group, or a carboxyl group.

Typical examples of the above-mentioned diphosphonic acid derivatives having the general formula (I) are 1-hydroxyethane-1,1-diphosphonic acid (HEDP), disodium 1-hydroxyethane-1,1-diphosphonate (HEDP-2Na), calcium 1-hydroxyethane-1,1-diphosphonate (HEDP-Ca), diammonium 1-hydroxyethane-1,1-diphosphonate (HEDP-2NH₃), ditriethanol amine 1-hydroxyethane-1,1-diphosphonate (HEDP-2TEA), tetratriethanol amine 1-hydroxyethane-1,1-diphosphonate (HEDP-4TEA), di(2-ethyl)hexylamine 1-hydroxyethane-1,1-diphosphonate (HEDP-2EHA), tetra(2-ethyl)hexylamine 1-hydroxyethane-1,1-diphosphonate (HEDP-4EHA), 1-hydroxy-ethane-1,1-diphosphonic acid (HPDP), 1-hydroxyphenylmethane-1,1-diphosphonic acid (HPhDP), 1-hydroxydodecane-1,1-diphosphonic acid (HDDP), and 1-hydroxyoctadecane-1,1-diphosphonic acid (HODP). These diphosphonic acid derivatives can be used alone or in any mixture thereof.

The diphosphonic acid should be used in an amount of 0.5 part by weight or more, preferably 0.8 part, by weight, more preferably 0.8 to 7.9 parts by weight, based on 100 parts by weight of the total amount of the resin and the metallic powder contained in the electrically conductive resin composition. The use of the diphosphonic acid in an amount of less than 0.5 part by weight based on 100 parts by weight of the total amount of the resin and the metallic powder cannot desirably improve the electrical conductivity and electromagnetic wave shielding properties of the resultant composition.

(iv) Hydroxyl-Containing Compound

The hydroxyl-containing compounds usable in the present invention are those having the following formulae (II) to (VI):

  (II)

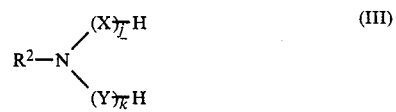  (III)

  (IV)

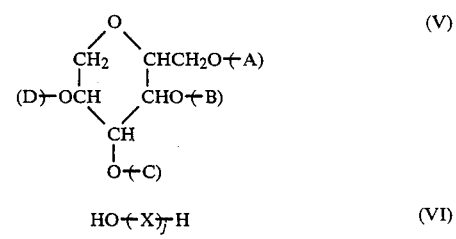  (V)

$$HO\!+\!X\!\!\rightarrow_{\overline{j}}\!H \quad (VI)$$

wherein
$R^2$ represents alkyl, aryl, or alkylaryl, X and Y independently represent

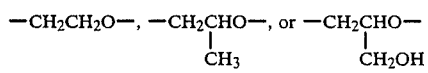

A, B, C, and D independently represent

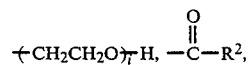

or hydrogen, i is 0 to 40, and j and k are independently 1 to 100.

The substituent $R^2$ preferably represents alkyl having 4 to 22 carbon atoms, aryl having 6 to 10 carbon atoms, and alkylaryl having 7 to 19 carbon atoms with $C_1$ to $C_9$ alkyl.

Typical examples of the compounds (II) are aliphatic alcohols such as lauryl alcohol, myristyl alcohol, palmityl alcohol, stearyl alcohol, behenyl alcohol, oleyl alcohol, and isostearyl alcohol; phenols such as nonyl phenol and octyl phenol; and the addition products of alcohols with ethylene oxide such as cetyl alcohol-ethylene oxide (30 mole) addition product, oleyl alcohol-ethylene oxide (3 mole) addition product, oleyl alcohol-ethylene oxide (50 mole) addition product, stearyl alcohol-ethylene oxide (2 mole) addition product, stearyl alcohol-ethylene oxide (11 mole) addition product, stearyl alcohol-ethylene oxide (40 mole) addition product, lauryl alcohol-ethylene oxide (3 mole) addition product, lauryl alcohol-ethylene oxide (50 mole) addition product, octyl alcohol-ethylene oxide (5 mole) addition product, octyl alcohol-ethylene oxide (25 mole) addition product, butyl alcohol-ethylene oxide (5 mole) addition product, butyl alcohol-ethylene oxide (40 mole) addition product, nonyl phenol-ethylene oxide (2 mole) addition product, nonyl phenol-ethylene oxide (30 mole) addition product, and octyl phenol-ethylene oxide (30 mole) addition product.

Typical examples of the compounds (III) are ethylene oxide or propylene oxide addition products of aliphatic higher amines such as lauryl diethanolamine, lauryl amine-ethylene oxide (20 mole) addition product, myristyl diethanolamine, palmityl diethanolamine, stearyl diethanolamine, stearyl amine-ethylene oxide (12 mole) addition product, oleyl diethanolamine, lauryl diisopropanol amine, myristyl diisopropanolamine, and palmityl diisopropanolamine.

Typical examples of the compounds (IV) are fatty acids such as capric acid, oleic acid, stearic acid, palmitic acid, lauric acid, myristic acid, and behenic acid; fatty acid-ethylene oxide addition products such as oleic acid-ethylene oxide (5 mole) addition product, stearic acid-ethylene oxide (5 mole) addition product, and stearic acid-ethylene oxide (40 mole) addition product; and glycerol esters such as caprylic monoglyceride, oleic monoglyceride, palmitic monoglyceride, lauric monoglyceride, and diglycerol monostearate.

Typical examples of the compounds (V) are sorbitan esters such as sorbitan monolaurate, sorbitan monooleate, sorbitan monopalmitate, sorbitan sesquioleate, sorbitan dilaurate, sorbitan dipalmitate, and sorbitan dioleate.

Typical examples of the compounds (VI) are glycerol, polyethylene glycol, polypropylene glycol, polypropylene glycol-ethylene oxide addition products such as polyethylene glycol (molecular weight (i.e., M.W.)=(190–210), polyethylene glycol (M.W.=500–600), polyethylene glycol (M.W.=3000–3700), diethylene glycol, polypropylene glycol (M.W.=100–300), polypropylene (M.W.=3000–5000), polypropylene (M.W.=1200)—ethylene oxide (20% by weight in the total product) addition product, and polypropylene glycol (M.W.=3520)—ethylene oxide (50% by weight in the total product) addition product.

The hydroxyl-containing compound should be used in an amount of 0.08 part by weight or more, preferably 0.1 part by weight or more, more preferably 0.1 to 7.5 parts by weight, based on 100 parts by weight of the total amount of the resin and the metallic powder. The use of the hydroxyl-containing compound in an amount of less than 0.08 parts by weight based on 100 parts by weight of the total amount of the resin and the metallic powder cannot desirably improve the electrical conductivity and electromagnetic wave shielding properties of the resultant composition.

Furthermore, the total amount of the diphosphonic acid derivative and the hydroxyl-containing compound is preferably 0.58 to 8 parts by weight, more preferably 0.9 to 8 parts by weight, based on 100 parts by weight of the total amount of the resin and the metallic powder, from the viewpoint of the possible occurrence of undesirable bleedout of the diphosphonic acid and/or the hydroxyl-containing compound.

The electrically conductive resin composition according to the present invention may be prepared from the metallic powder, the resin, the diphosphonic acid derivative, and the hydroxyl-containing compound in any conventional manner. For example, the metallic powder is first mixed with the diphosphonic acid derivative and the hydroxyl-containing compound, followed by mixing with the resin. Alternatively, the metallic powder can be first treated in a mixture of the diphosphonic acid derivative and the hydroxyl-containing compound in an organic solvent (e.g., alcohol), followed by mixing with the resin. Furthermore, the resin, the diphosphonic acid, and the hydroxyl-containing compound are first mixed together, followed by mixing with the metallic powder or the metallic powder, the resin, the phosphonic acid derivative, and the hydroxyl-containing compound can be simultaneously mixed together to form the desired electrically conductive resin composition. The electrically conductive resin composition according to the present invention can be processed or molded into any conventional form or shape depending upon the intended final use. For example, the electrically conductive resin composition containing, if desired, various conventional components such as anti-aging agents (or antioxidants) for resins, UV absorbers, fire retardants, reinforcing agents, and lubricants can be formed into the shape of sheets or films by using a processing means such as injection molding machines, calender rolls, inflation molding machines, or heat presses to form electrically conductive molded articles in the form of sheets or films.

The electrically conductive coating compositions according to the present invention may contain, in addition to the above-mentioned essential components, diluting solvents. Examples of the organic solvents usable in the composition according to the present invention are alcohols such as butyl alcohol; ketones such as methyl ethyl ketone; esters such as ethyl acetate; aromatic hydrocarbons such as toluene and xylene; and ethers such as turpentine oil, butyl cellosolve (available from U.C.C.), and Carbitol (available from U.C.C.). Although there are no critical limitations to the amounts of the solvents contained in the compositions, the solvents are suitably contained in 10 to 500 parts by weight, preferably 30 to 200 parts by weight, based on 100 parts by weight of the total amount of the metallic powder and the resin.

Furthermore, to prevent the setting of the metallic powder in the present resin composition during storage and to facilitate a good dispersibility of the metallic powder in the present resin compositions, thixotropy-providing agents such as colloidal silica or coupling agents such as silane coupling agents can be used in the present resin composition.

The present electrically conductive resin compositions containing the above-mentioned components can be advantageously and widely utilized as, for example, electrically conductive coating compositions.

For example, the electrically conductive coating composition according to the present invention can be applied, for example, to the back surface of plastic molded articles by any conventional manner, for example, spray coating, brush coating, and screen printing, to provide the desired electrical conductivity to the plastic molded articles.

As mentioned above, according to the present invention, the desired electrically conductive resin composition having an excellent electrical conductivity and shield effectivenesses and long-term electrical conductivity and shield effectivenesses retention can be obtained even at a low content of the metallic powder by using the specified diphosphonic acid derivative in combination with the hydroxyl-containing compound.

For example, when the present electrically conductive resin composition contains 50 parts by weight of copper fine powder, 50 parts by weight of polypropylene (i.e., resin), 2.5 parts by weight of 1-hydroxyethane-1,1-diphosphonic acid (HEDP) (i.e., diphosphonic acid derivative), and 2.5 parts by weight of stearyl alcohol (i.e., hydroxyl-containing compound), the specific volume resistance (i.e., V.R.) representing the electric characteristics is $1.0 \times 10^{-2}$ $\Omega \cdot$cm and the shield effectiveness is 70 dB at 300 MHz in an electric field. Contrary to this, when the composition does not contain the diphosphonic acid derivative and/or the hydroxyl-containing compound, the V.R. is $1.0 \times 10^8$ $\Omega \cdot$cm and the shield effect is approximately 1 dB. Thus, the superiority of the present invention can be clearly noted. On the other hand, if the diphosphonic acid derivative and the hydroxyl-containing compound according to the present invention are not used, 80% by weight of copper powder must be added to polypropylene having a specific gravity of 0.91 g/cm$^3$ to obtain the similar the above-mentioned V.R. and shield effects. As a result, the specific gravity of the molded article obtained therefrom becomes large, for example, 3.2 g/cm$^3$ and the moldability is remarkably reduced so that the use of the conventional injection molding practically used in the molding of plastics becomes difficult. Contrary to this, according to the present invention, similar electrical conductivity and shield effects can be obtained from the addition of approximately 50% by weight of the copper powder, without causing problems in the injection molding, and the specific gravity of the resultant polypropylene molded article is as light as approximately 1.6 kg/cm$^3$.

Furthermore, the electrically conductive resin compositions according to the present invention exhibit an excellent long-term electrical conductivity and shield effect retentions at exposure tests at ambient temperature and a temperature of 80° C. The decreases in these properties are disadvantages of the conventional compositions, and thus the present electrically conductive resin compositions can be advantageously used as shield molding materials without practical problems.

The present electrically conductive resin compositions can be also applied as resistance elements for static resistant floor materials, packaging or wrapping materials, and flat heater elements.

EXAMPLES

The present invention now will be further illustrated by, but is by no means limited to, the following examples, in which all parts and percentages are expressed on a weight basis unless otherwise specified.

The physical properties of the compositions are evaluated as follows.

The electrical conductivity was evaluated in terms of the specific volume resistivity as determined by the SRIS 2301 method of the Japan Rubber Manufacturers' Association.

The overall bleedout property was evaluated by visually determining the bleedout and the gloss (Japan Industrial Standard (JIS) Z 8741) of molded articles immediately after molding and after allowing the molded articles to stand for one year at a temperature of 20° C. and a relative humidity of 60% in a constant temperature and humidity chamber. The bleedout property was evaluated based on the following criteria:

o: No bleedout visually observed and the gloss was 75% or more of that of the blank.

Δ: Bleedout was visually observed or the gloss was less than 75% of that of the blank.

x: Bleedout was visually observed and the gloss was less than 75% of that of the blank.

The moldability of the composition was evaluated by injection molding based on the following criteria:

o ... Injection molding possible x ... Injection molding impossible

The electromagnetic wave shielding effectiveness were determined by a detector TR-4172 manufactured by Takeda Riken, Japan and were evaluated at 300 MHz in an electric field.

EXAMPLE 1

A 2.5 part amount of each diphosphonic acid derivative and 2.5 parts of each hydroxyl-containing compound listed in Table 1 were mixed or kneaded, together with 50 parts of polypropylene and 50 parts of electrolytic copper powder having a size of 350 mesh pass at a temperature of 200° C. in a labo-type plastomill. The resultant mixture was then press-molded at a temperature of 220° C. under a pressure of 150 kg/cm$^2$ to form a 15 cm square plate having a thickness of 2 mm.

The V.R., shield effects, and the bleedout property of the molded plates obtained above were determined. The molded product was crushed into the form of pellets and the moldability was evaluated by injection molding the resultant pellets.

The results are shown in Table 1.

TABLE 1

| Run No. | Additive Diphosphonic acid deriv. | Hydroxyl-containing compd. | V.R. ($\Omega \cdot$ cm) after molding | V.R. 20° C. 60% RH, one year | V.R. 80° C. 30 days | Shield effectiveness (dB) (Elec. field, 300 MHz) After molding | 20° C. 60% RH, One year | 80° C. 30 days | Bleedout property After molding | 20° C. 60% RH, One year | Injection moldability |
|---|---|---|---|---|---|---|---|---|---|---|---|
| 1 | HEDP | Lauryl alcohol | $1.2 \times 10^{-2}$ | $1.3 \times 10^{-2}$ | $1.3 \times 10^{-2}$ | 70 | 71 | 70 | o | o | o |
| 2 | " | Stearyl alcohol | $1.4 \times 10^{-2}$ | $1.3 \times 10^{-2}$ | $1.4 \times 10^{-2}$ | 69 | 68 | 70 | o | o | o |
| 3 | " | Stearyl alcohol-ethylene oxide (11 mol) addition product | $1.5 \times 10^{-2}$ | $1.3 \times 10^{-2}$ | $1.2 \times 10^{-2}$ | 68 | 70 | 71 | o | o | o |
| 4 | " | Lauryl diethanol amine | $1.8 \times 10^{-2}$ | $1.7 \times 10^{-2}$ | $1.6 \times 10^{-2}$ | 68 | 69 | 69 | o | o | o |

TABLE 1-continued

| Run No. | Additive Diphosphonic acid deriv. | Additive Hydroxyl-containing compd. | V.R. (Ω·cm) after molding | V.R. (Ω·cm) 20° C. 60% RH, one year | V.R. (Ω·cm) 80° C. 30 days | Shield effectiveness (dB) (Elec. field, 300 MHz) After molding | Shield effectiveness (dB) 20° C. 60% RH, One year | Shield effectiveness (dB) 80° C. 30 days | Bleedout property After molding | Bleedout property 20° C. 60% RH, One year | Injection moldability |
|---|---|---|---|---|---|---|---|---|---|---|---|
| 5 | " | Glycerol | $1.4 \times 10^{-2}$ | $1.2 \times 10^{-2}$ | $1.3 \times 10^{-2}$ | 68 | 71 | 68 | o | o | o |
| 6 | " | Glycerol monooleate | $1.2 \times 10^{-2}$ | $1.5 \times 10^{-2}$ | $1.5 \times 10^{-2}$ | 70 | 69 | 68 | o | o | o |
| 7 | " | Stearic acid-ethylene oxide (5 mol) addition product | $1.8 \times 10^{-2}$ | $1.3 \times 10^{-2}$ | $1.3 \times 10^{-2}$ | 68 | 70 | 69 | o | o | o |
| 8 | " | Sorbitan monostearate | $1.2 \times 10^{-2}$ | $1.7 \times 10^{-2}$ | $1.3 \times 10^{-2}$ | 71 | 70 | 69 | o | o | o |
| 9 | " | Polyethylene glycol (M.W. = 3000-3700) | $1.8 \times 10^{-2}$ | $1.9 \times 10^{-2}$ | $1.8 \times 10^{-2}$ | 70 | 68 | 70 | o | o | o |
| 10 | HEDP-2Na | Stearyl alcohol | $1.2 \times 10^{-2}$ | $1.3 \times 10^{-2}$ | $1.6 \times 10^{-2}$ | 69 | 70 | 69 | o | o | o |
| 11 | HEDP-2NH$_3$ | Lauryl dimethanolamine | $1.4 \times 10^{-2}$ | $1.2 \times 10^{-2}$ | $1.3 \times 10^{-2}$ | 69 | 70 | 71 | o | o | o |
| 12 | HEDP-2TEA | Stearyl alcohol | $1.8 \times 10^{-2}$ | $1.6 \times 10^{-2}$ | $1.7 \times 10^{-2}$ | 70 | 69 | 71 | o | o | o |
| 13 | HEDP-2EHA | Glycerol monooleate | $1.7 \times 10^{-2}$ | $1.6 \times 10^{-2}$ | $1.2 \times 10^{-2}$ | 69 | 70 | 70 | o | o | o |
| 14 | HPDP | Lauryl alcohol | $1.2 \times 10^{-2}$ | $1.4 \times 10^{-2}$ | $1.5 \times 10^{-2}$ | 70 | 69 | 70 | o | o | o |
| 15 | HPhDP | Polyethylene glycol (M.W. = 500-600) | $1.4 \times 10^{-2}$ | $1.2 \times 10^{-2}$ | $1.3 \times 10^{-2}$ | 69 | 70 | 69 | o | o | o |
| 16 | HDDP | Lauric acid | $1.3 \times 10^{-2}$ | $1.5 \times 10^{-2}$ | $1.2 \times 10^{-2}$ | 70 | 69 | 70 | o | o | o |
| 17 | HODP | Stearyl alcohol-ethylene oxide (40 mol) addition product | $1.5 \times 10^{-2}$ | $1.7 \times 10^{-2}$ | $1.2 \times 10^{-2}$ | 70 | 70 | 69 | o | o | o |

COMPARATIVE EXAMPLE 1

A 2.5 part amount of a diphosphonic acid derivative and 2.5 parts of a compound having no hydroxyl group, 2.5 parts of a diphosphonic acid derivative, or 2.5 parts of a hydroxyl-containing compound was added to 50 parts of polypropylene and 50 parts of electrolytic copper powder having a size of 350 mesh pass. The resultant composition was mixed and molded in the same manner as in Example 1 and the V.R. and shield effectiveness were evaluated in the same manner as in Example 1.

The results are shown in Table 2.

TABLE 2

| Run No. | Additive | V.R. (Ω·cm) | Shield effectiveness (dB) (Electric field, 300 MHz) |
|---|---|---|---|
| 18 | HEDP | $8.9 \times 10^8$ | 0 |
| 19 | HDDP | $6.1 \times 10^8$ | 1 |
| 20 | HEDP-2NH$_3$ | $3.9 \times 10^8$ | 1 |
| 21 | Polyethylene glycol (M.W. 3000-3700) | $3.8 \times 10^8$ | 1 |
| 22 | Stearyl alcohol | $2.2 \times 10^8$ | 0 |
| 23 | Glycerol monostearate | $1.6 \times 10^8$ | 1 |
| 24 | HEDP/Stearic amide | $3.4 \times 10^8$ | 1 |

TABLE 2-continued

| Run No. | Additive | V.R. (Ω·cm) | Shield effectiveness (dB) (Electric field, 300 MHz) |
|---|---|---|---|
| 25 | HEDP/Ethyl stearate | $5.5 \times 10^8$ | 0 |
| 26 | HEDP/Stearyl amine | $3.9 \times 10^8$ | 0 |

EXAMPLE 2

A 50 g amount of electrolytic copper powder having size of 350 mesh pass was added to 100 g of a 5% ethanol solution of a diphosphonic acid derivative/a hydroxyl-containing compound (1/1), followed by stirring at room temperature for 15 minutes. The copper powder was recovered by filtration, followed by drying under reduced pressure at 40° C. for 8 hours.

Then, 50 parts of the resultant copper powder and 50 parts of polypropylene were mixed and molded in the same manner as in Example 1. The V.R. and the shield effectivenesses of the molded article were determined in the same manner as in Example 1. Furthermore, after exposure under the same conditions as in Example 1, the V.R. and shield effectivenesses were determined.

The results are shown in Table 3.

TABLE 3

| Run No. | Methanol solution in which copper powder Diphosphonic acid deriv. | Methanol solution in which copper powder Hydroxyl-containing compd. | V.R. (Ω·cm) After molding | V.R. (Ω·cm) 20° C. 60% RH, 1 year | V.R. (Ω·cm) 80° C. 60% 30 days | Shield effectiveness (dB) Elec. field, 300 MHz After molding | Shield effectiveness (dB) 20° C. 60% RH, 1 year | Shield effectiveness (dB) 80° C. 30 days |
|---|---|---|---|---|---|---|---|---|
| 27 | HEDP | Stearyl alcohol | $1.2 \times 10^{-2}$ | $1.1 \times 10^{-2}$ | $1.2 \times 10^{-2}$ | 70 | 71 | 69 |
| 28 | " | Stearyl alcohol-ethylene oxide (11 mol) addition product | $1.3 \times 10^{-2}$ | $1.2 \times 10^{-2}$ | $1.5 \times 10^{-2}$ | 70 | 70 | 69 |

TABLE 3-continued

| | Methanol solution in which copper powder | | V.R. (Ω · cm) | | | Shield effectiveness (dB) Elec. field, 300 MHz) | | |
|---|---|---|---|---|---|---|---|---|
| Run No. | Diphosphonic acid deriv. | Hydroxyl-containing compd. | After molding | 20° C. 60% RH, 1 year | 80° C. 60% 30 days | After molding | 20° C. 60% RH, 1 year | 80° C. 30 days |
| 29 | " | Polyethylene glycol (M.W. = 3000–3700) | $1.4 \times 10^{-2}$ | $1.4 \times 10^{-2}$ | $1.3 \times 10^{-2}$ | 68 | 70 | 70 |
| 30 | HEDP-2EHA | Glycerol monostearate | $1.3 \times 10^{-2}$ | $1.3 \times 10^{-2}$ | $1.4 \times 10^{-2}$ | 70 | 68 | 68 |
| 31 | HDDP | Stearyl alcohol | $1.2 \times 10^{-2}$ | $1.2 \times 10^{-2}$ | $1.3 \times 10^{-2}$ | 70 | 70 | 71 |
| 32 | HPhDP | " | $1.3 \times 10^{-2}$ | $1.3 \times 10^{-2}$ | $1.5 \times 10^{-2}$ | 70 | 71 | 68 |

EXAMPLE 3

Various amounts of HEDP and stearyl alcohol were added to 50 parts of polypropylene and 50 parts of electrolytic copper powder having a size of 350 mesh pass and the resultant mixture was mixed and molded in the same manner as in Example 1. The V.R., shield effect, and bleedout property of the molded article were evaluated in the same manner as in Example 1. Furthermore, after exposure under the same conditions as in Example 1, the V.R., shield effectiveness, and bleedout property was evaluated in the same manner as in Example 1.

The results are shown in Table 4.

As is clear from the results shown in Table 4, the amount of the hydroxyl-containing compound used in the present invention is preferably 0.08 parts or more based on 100 parts of the metallic powder and the resin. Furthermore, it is clear that, when the total amount of the diphosphonic acid derivative and the hydroxyl-containing compound used is more than 8 parts based on 100 parts of the total amount of the metallic powder and the resin, undesirable bleedout occurs and, therefore, the use of 8 parts or less of the total amount of the diphosphonic acid derivative and the resin is suitable.

EXAMPLE 4

Various amounts of electrolytic copper powder having a size of 350 mesh pass were added to polypropylene and, to 100 parts of the mixture, 2.5 parts of HEDP and 2.5 parts of stearyl alcohol were added. The resultant mixture was mixed and molded in the same manner as in Example 1. The V.R., shield effectivenesses, and bleedout properties of the resultant molded articles were evaluated in the same manner as in Example 1. The resultant molded article was further crushed to obtain pellets. The pellets were injection molded and the moldability thereof was evaluated in the same manner as in Example 1.

The results are shown in Table 5.

From the results shown in Table 5, it is clear that the amount of the metal powder is preferably 70% or less based on the total amount of the resin and the metallic powder.

TABLE 5

| | Composition | | V.R. (Ω · cm) | | | Shield effectiveness (dB) (Elec. field 300 MHz) | | | Bleedout property | | Injection |
|---|---|---|---|---|---|---|---|---|---|---|---|
| Run No. | Polypropylene (part) | Cu Powder (part) | After molding | 20° C. 60% RH, 1 year | 80° C. 30 days | After molding | 20° C. 60% RH, 1 year | 80° C. 30 days | After molding | 20° C. 60% RH, 1 year | moldability |
| 44 | 90 | 10 | $1.3 \times 10^{8}$ | $1.2 \times 10^{8}$ | $1.4 \times 10^{8}$ | 1 | 0 | 1 | o | o | o |
| 45 | 85 | 15 | $4.1 \times 10^{1}$ | $4.2 \times 10^{1}$ | $4.3 \times 10^{1}$ | 31 | 30 | 31 | o | o | o |
| 46 | 80 | 20 | $1.3 \times 10^{-2}$ | $1.5 \times 10^{-2}$ | $1.6 \times 10^{-2}$ | 70 | 69 | 70 | o | o | o |
| 47 | 60 | 40 | $1.0 \times 10^{-2}$ | $1.1 \times 10^{-2}$ | $1.0 \times 10^{-2}$ | 71 | 70 | 70 | o | o | o |
| 48 | 40 | 60 | $9.7 \times 10^{-3}$ | $9.8 \times 10^{-3}$ | $9.8 \times 10^{-3}$ | 72 | 72 | 71 | o | o | o |
| 49 | 30 | 70 | $7.2 \times 10^{-3}$ | $7.1 \times 10^{-3}$ | $7.3 \times 10^{-3}$ | 73 | 73 | 73 | o | o | o |
| 50 | 25 | 75 | $4.5 \times 10^{-3}$ | $4.6 \times 10^{-3}$ | $4.6 \times 10^{-3}$ | 73 | 73 | 73 | o | o | x |
| 51 | 20 | 80 | $4.7 \times 10^{-3}$ | $4.6 \times 10^{-3}$ | $4.7 \times 10^{-3}$ | 73 | 73 | 73 | o | o | x |

EXAMPLE 5

To 50 parts of various resins and 50 parts of electrolytic copper powder having a size of 350 mesh pass, 2.5 parts of HEDP and 2.5 parts of stearyl alcohol were formulated. The mixtures were mixed and, molded, and the V.R., shield effects, and bleedout properties were evaluated, in the same manner as in Example 1. Further-

TABLE 4

| | Additive | | V.R. (Ω · cm) | | | Shield effectiveness (dB) (Elec. field, 300 MHz) | | | Bleedout property | |
|---|---|---|---|---|---|---|---|---|---|---|
| Run No. | HEDP (part) | Stearyl alcohol (part) | After molding | 20° C. 60% RH, 1 year | 80° C. 30 days | After molding | 20° C. 60% RH, 1 year | 80° C. 30 days | After molding | 20° C. 60% RH, 1 year |
| 33 | 2.5 | 0.05 | $1.6 \times 10^{8}$ | $1.7 \times 10^{8}$ | $1.8 \times 10^{8}$ | 1 | 1 | 1 | o | o |
| 34 | 2.5 | 0.08 | $3.4 \times 10^{0}$ | $3.5 \times 10^{0}$ | $3.5 \times 10^{0}$ | 42 | 42 | 41 | o | o |
| 35 | 2.5 | 0.1 | $1.6 \times 10^{-2}$ | $1.3 \times 10^{-2}$ | $1.2 \times 10^{-2}$ | 70 | 71 | 69 | o | o |
| 36 | 2.5 | 3.0 | $1.7 \times 10^{-2}$ | $1.4 \times 10^{-2}$ | $1.3 \times 10^{-2}$ | 70 | 71 | 69 | o | o |
| 37 | 2.5 | 5.5 | $2.0 \times 10^{-2}$ | $1.8 \times 10^{-2}$ | $1.4 \times 10^{-2}$ | 70 | 71 | 70 | o | Δ |
| 38 | 2.5 | 6.0 | $1.2 \times 10^{-2}$ | $1.6 \times 10^{-2}$ | $1.8 \times 10^{-2}$ | 71 | 71 | 70 | X | X |
| 39 | 0.3 | 2.5 | $3.3 \times 10^{-2}$ | $5.9 \times 10^{-2}$ | $2.5 \times 10^{14}$ | 1 | 0 | 0 | o | o |
| 40 | 0.5 | 2.5 | $3.6 \times 10^{1}$ | $2.7 \times 10^{1}$ | $5.9 \times 10^{1}$ | 32 | 31 | 32 | o | o |
| 41 | 0.8 | 2.5 | $1.3 \times 10^{-2}$ | $1.9 \times 10^{-2}$ | $1.4 \times 10^{-2}$ | 69 | 70 | 71 | o | o |
| 42 | 5.5 | 2.5 | $1.4 \times 10^{-2}$ | $1.6 \times 10^{-2}$ | $1.3 \times 10^{-2}$ | 70 | 69 | 70 | o | Δ |
| 43 | 6.0 | 2.5 | $1.5 \times 10^{-2}$ | $1.8 \times 10^{-2}$ | $1.5 \times 10^{-2}$ | 70 | 73 | 70 | X | X | more, the V.R., shield effectiveness, and bleedout properties were evaluated after exposing under the same conditions as in Example 1. The molded articles were crushed to obtain pellets and the pellets were injection molded to evaluate the moldability thereof.

The results are shown in Table 6.

EXAMPLE 6

Various kinds of metallic powder particles or fibers were added to polypropylene in the amounts listed in Table 8 and, to 100 parts of these mixtures, 2.5 parts of HEDP and 2.5 parts of stearyl alcohol were added, followed by mixing and molding in the same manner as in Example 1. The V.R., shield effects, and bleedout properties were evaluated in the same manner as in Example 1. Furthermore, the molded articles were exposed under the same conditions as in Example 1 and the V.R., shield effectivenesses, and bleedout properties were evaluated. Furthermore, the molded articles were crushed to obtain pellets and the pellets were used in the evaluation of the injection moldability thereof.

The results are shown in Table 8.

TABLE 6

| Run No. | Resin | Additive HEDP (part) | Additive Stearyl alcohol (part) | V.R. (Ω·cm) After molding | V.R. (Ω·cm) 20° C. 60% RH, 1 year | V.R. (Ω·cm) 80° C. 30 days | Shield effectiveness (dB) (Elec. field, 300 MHz) After molding | Shield effectiveness (dB) 20° C. 60% RH, 1 year | Shield effectiveness (dB) 80° C. 30 days | Bleedout property After molding | Bleedout property 20° C. 60% RH, 1 year | Injection moldability |
|---|---|---|---|---|---|---|---|---|---|---|---|---|
| 56 | Low-density polyethylene | 2.5 | 2.5 | $1.3 \times 10^{-2}$ | $1.5 \times 10^{-2}$ | $1.4 \times 10^{-2}$ | 70 | 69 | 68 | o | o | o |
| 57* | Low-density polyethylene | 0 | 0 | $1.3 \times 10^{8}$ | $>1 \times 10^{16}$ | $>1 \times 10^{16}$ | 1 | 0 | 0 | o | o | o |
| 58 | ABS | 2.5 | 2.5 | $1.8 \times 10^{-2}$ | $1.9 \times 10^{-2}$ | $2.0 \times 10^{-2}$ | 69 | 70 | 70 | o | o | o |
| 59* | ABS | 0 | 0 | $2.9 \times 10^{8}$ | $>1 \times 10^{16}$ | $>1 \times 10^{16}$ | 1 | 1 | 0 | o | o | o |
| 60 | Polystyrene | 2.5 | 2.5 | $2.0 \times 10^{-2}$ | $1.9 \times 10^{-2}$ | $2.0 \times 10^{-2}$ | 70 | 69 | 69 | o | o | o |
| 61* | Polystyrene | 0 | 0 | $2.1 \times 10^{8}$ | $>1 \times 10^{16}$ | $>1 \times 10^{16}$ | 0 | 0 | 0 | o | o | o |

*Comparative Example

COMPARATIVE EXAMPLE 2

Various amounts of electrolytic copper powder having a size of 350 mesh pass were added to polypropylene. The mixture was mixed and molded and the V.R., shield effectivenesses and bleedout property were evaluated, in the same manner as in Example 1. The molded articles were crushed to obtain the pellets and the pellets were used in the evaluation of the injection moldability thereof in the same manner as in Example 1.

The results are shown in Table 7.

TABLE 7

| Run No. | Composition Polypropylene (part) | Composition Cu powder (part) | V.R. (Ω·cm) After molding | V.R. (Ω·cm) 20° C. 60% RH, 1 year | V.R. (Ω·cm) 80° C. 30 days | Shield effectiveness (dB) (Elec. field, 300 MHz) After molding | Shield effectiveness (dB) 20°C. 60% RH, 1 year | Shield effectiveness (dB) 80° C. 30 days | Injection moldability |
|---|---|---|---|---|---|---|---|---|---|
| 62 | 10 | 90 | $2.0 \times 10^{-2}$ | $1.5 \times 10^{-1}$ | $1.3 \times 10^{0}$ | 70 | 50 | 30 | x |
| 63 | 20 | 80 | $5.7 \times 10^{-2}$ | $2.3 \times 10^{0}$ | $2.9 \times 10^{3}$ | 72 | 30 | 15 | x |
| 64 | 30 | 70 | $3.9 \times 10^{2}$ | $5.7 \times 10^{7}$ | $1.4 \times 10^{8}$ | 20 | 10 | 1 | x |
| 65 | 35 | 65 | $1.6 \times 10^{8}$ | $>1 \times 10^{16}$ | $>1 \times 16^{16}$ | 1 | 0 | 0 | o |

TABLE 8

| Run No. | Kind of metallic powder | Composition Polypropylene (part) | Composition Metal (part) | Composition HEDP (part) | Composition Stearyl alcohol (part) | V.R. (Ω·cm) After molding | V.R. (Ω·cm) 20° C. 60% RH, 1 year | V.R. (Ω·cm) 80° C. 30 days | Shield effectiveness (dB) (Elec. field, 300 MHz) After molding | Shield effectiveness (dB) 20° C. 60% RH, 1 year | Shield effectiveness (dB) 80° C. 30 days | Injection moldability |
|---|---|---|---|---|---|---|---|---|---|---|---|---|
| 66 | Nickel powder | 50 | 50 | 2.5 | 2.5 | $2.4 \times 10^{-2}$ | $2.5 \times 10^{-2}$ | $2.4 \times 10^{-2}$ | 65 | 64 | 65 | o |
| 67* | Nickel powder | 50 | 50 | 0 | 0 | $4.3 \times 10^{11}$ | $>1 \times 10^{16}$ | $>1 \times 10^{16}$ | 0 | 0 | 0 | o |
| 68 | Iron powder | 50 | 50 | 2.5 | 2.5 | $2.1 \times 10^{-1}$ | $2.1 \times 10^{-1}$ | $2.0 \times 10^{-1}$ | 47 | 49 | 48 | o |
| 69* | Iron powder | 50 | 50 | 0 | 0 | $>1 \times 10^{16}$ | $>1 \times 10^{16}$ | $>1 \times 10^{16}$ | 0 | 0 | 0 | o |
| 70 | Aluminum flake | 60 | 40 | 2.5 | 2.5 | $4.3 \times 10^{-2}$ | $4.2 \times 10^{-2}$ | $4.5 \times 10^{-2}$ | 60 | 61 | 59 | o |
| 71* | Aluminum flake | 60 | 40 | 0 | 0 | $2.7 \times 10^{6}$ | $3.0 \times 10^{8}$ | $5.0 \times 10^{8}$ | 2 | 0 | 0 | o |
| 72 | Aluminum fiber | 50 | 50 | 2.5 | 2.5 | $2.0 \times 10^{-2}$ | $2.3 \times 10^{-2}$ | $2.2 \times 10^{-2}$ | 64 | 65 | 65 | o |
| 73* | Aluminum fiber | 50 | 50 | 0 | 0 | $1.9 \times 10^{6}$ | $6.3 \times 10^{7}$ | $3.2 \times 10^{8}$ | 3 | 0 | 0 | o |
| 74 | Brass fiber | 50 | 50 | 2.5 | 2.5 | $3.1 \times 10^{-2}$ | $3.3 \times 10^{-2}$ | $3.2 \times 10^{-2}$ | 57 | 56 | 56 | o |
| 75* | Brass | 50 | 50 | 0 | 0 | $2.3 \times 10^{6}$ | $7.4 \times 10^{7}$ | $3.5 \times 10^{8}$ | 2 | 0 | 0 | o |

EXAMPLE 7

To 50 parts of polypropylene and 50 parts of electrolytic copper powder, 2.5 parts of HEDP, 2.5 parts of stearyl alcohol, and various additives for resins (i.e., antioxidant, UV absorber, fire retardant, reinforcing agent, lubricant) listed in Table 9 were added, followed by mixing and molding in the same manner as in Example 1. The V.R., shield effectivenesses, and bleedout properties before and after exposure were determined in the same manner as in Example 1. Furthermore, the molded articles were exposed under the same conditions as in Example 1 and the V.R., shield effectivenesses and bleedout properties were evaluated.

The results are shown in Table 9.

TABLE 9

| Run No. | Additive for Resin Kind | Addition amount (part) | V.R. (Ω · cm) After molding | V.R. 20° C. 60% RH, 1 year | V.R. 80° C. 30 days | Shield effectiveness (dB) (Elec. field, 300 MHz) After molding | 20° C. 60% RH, 1 year | 80° C. 30 days | Bleedout property After molding | 20° C. 60% RH, 1 year |
|---|---|---|---|---|---|---|---|---|---|---|
| 76 | Pentaerythzyl-tetrakis 3-(3,5-di-tert.-butyl-4-hydroxyl-phenyl)propionate | 0.1 | $1.3 \times 10^{-2}$ | $1.4 \times 10^{-2}$ | $1.3 \times 10^{-2}$ | 70 | 69 | 68 | o | o |
| 77 | 1-3,5-Tris(4-t-butyl-3-hydroxy-2,6-dimethylbenzyl)isocyanuric acid | 0.1 0.1 | $1.4 \times 10^{-2}$ $1.4 \times 10^{-2}$ | $1.3 \times 10^{-2}$ $1.3 \times 10^{-2}$ | $1.4 \times 10^{-2}$ $1.4 \times 10^{-2}$ | 71 71 | 70 70 | 70 70 | o o | o o |
| 78 | Phenyl salcylate | 0.1 | $1.5 \times 10^{-2}$ | $1.3 \times 10^{-2}$ | $1.2 \times 10^{-2}$ | 70 | 70 | 71 | o | o |
| 79 | 2-hydroxy-4-n-octoxy- | 0.1 | $1.2 \times 10^{-2}$ | $1.3 \times 10^{-2}$ | $1.1 \times 10^{-2}$ | 71 | 70 | 69 | o | o |
| 80 | Tricresylphosphate | 0.1 | $1.3 \times 10^{-2}$ | $2.1 \times 10^{-2}$ | $1.5 \times 10^{-2}$ | 70 | 69 | 69 | o | o |
| 81 | Trichloroethyl phosphate | 0.1 | $1.3 \times 10^{-2}$ | $2.0 \times 10^{-2}$ | $1.5 \times 10^{-2}$ | 69 | 70 | 71 | o | o |
| 82 | Zinc stearate | 0.1 | $1.9 \times 10^{-2}$ | $1.8 \times 10^{-2}$ | $1.9 \times 10^{-2}$ | 70 | 70 | 71 | o | o |
| 83 | Ethylene bisstearoamide | 0.1 | $1.5 \times 10^{-2}$ | $1.6 \times 10^{-2}$ | $1.7 \times 10^{-2}$ | 70 | 69 | 70 | o | o |
| 84 | Crysotile | 10 | $1.2 \times 10^{-2}$ | $1.3 \times 10^{-2}$ | $1.3 \times 10^{-2}$ | 69 | 70 | 69 | o | o |
| 85 | Glass fiber | 10 | $1.4 \times 10^{-2}$ | $1.5 \times 10^{-2}$ | $1.4 \times 10^{-2}$ | 70 | 69 | 70 | o | o |

We claim:

1. An electrically conductive resin composition comprising:
   (i) a resin;
   (ii) at least one metallic powder selected from the group consisting of nickel, copper, iron, aluminum, and alloys thereof;
   (iii) at least one diphosphonic acid derivative having the formula (I):

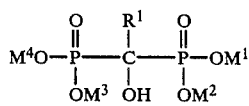

wherein R' represents alkyl having 1 to 18 carbon atoms, phenyl or alkylphenyl, the alkyl in alkylphenyl having 1 to 8 carbon atoms, and $M^1$ to $M^4$ each independently represent hydrogen or a cation;
   (iv) at least one hydroxyl-containing compound selected from the group consisting of the compounds having the formulas (II), (III), (IV), (V), and (VI):

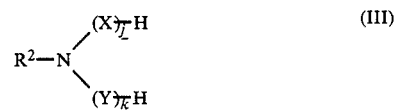

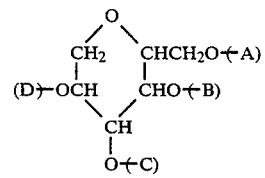

wherein $R^2$ represents alkyl having 4 to 22 carbon atoms, aryl having 6 to 10 carbon atoms, alkylaryl having 7 to 19 carbon atoms; X and Y independently represent

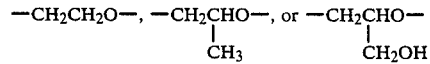

A, B, C, and D each independently represent

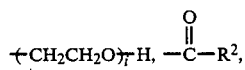

or -H; i is 0 to 40, and j and k are independently 1 to 40; wherein the weight ratio of the component (i)/the component (ii) is 30/70 to 85/15 and the amounts of the components (iii) and (iv) are 0.5 to 7.9 parts by weight and 0.08 to 7.5 parts by weight, respectively, based on 100 parts by weight of the component (i) and (ii).

2. An electrically conductive resin composition as claimed in claim 1, wherein the total amounts of the components (iii) and (iv) are 0.58 to 8 parts by weight based on 100 parts by weight of the components (i) and (ii).

3. An electrically conductive resin composition as claimed in claim 1, wherein the resin is a thermoplastic resin.

4. An electrically conductive resin composition as claimed in claim 3, wherein the thermoplastic resin is at least one resin selected from the group consisting of low-density polyethylene, high-density polyethylene, linear low-density polyethylene, polypropylene, polystyrene, ethylene-vinyl acetate copolymer, ABS resin, MMA resin, ethylene-acrylate copolymer, polyamide resin, and polyester resin.

5. An electrically conductive resin composition as claimed in claim 1, wherein the resin is a thermosetting resin.

6. An electrically conductive resin composition as claimed in claim 5, wherein the thermosetting resin is at least one resin selected from the group consisting of phenol resin, unsaturated polyester resin, epoxy resin, urethane resin, and alkyd resin.

7. An electrically conductive resin composition as claimed in claim 1, wherein the metallic powder is at least one member selected from the group consisting of nickel, copper, iron, and aluminum, and the alloys thereof.

8. An electrically conductive resin composition as claimed in claim 1, wherein the diphosphonic acid is 1-hydroxyethane-1,1-diphosphonic acid (HEDP), disodium 1-hydroxyethane-1,1-diphosphonate (HEDP-2Na), calcium 1-hydroxyethane-1,1-diphosphonate (HEDP-Ca), diammonium 1-hydroxyethane-1,1-diphosphonate (HEDP-2NH$_3$), ditriethanol amine 1-hydroxyethane-1,1-diphosphonate (HEDP-2TEA), tetratriethanol amine 1-hydroxyethane-1,1-diphosphonate (HEDP-4TEA), di(2-ethyl)hexylamine 1-hydroxyethane-1,1-diphosphonate (HEDP-2EHA), tetra(2-ethyl)hexylamine 1-hydroxyethane-1,1-diphosphonate (HEDP-4EHA), 1-hydroxypropane-1,1-diphosphonic acid (HPDP), 1-hydroxyphenylmethane-1,1-diphosphonic acid (HPhDP) 1-hydroxydodecane-1,1-diphosphonic acid (HDDP), 1-hydroxyoctadecane-1,1-diphosphonic acid (HODD).

9. An electrically conductive resin composition as claimed in claim 1, wherein the hydroxyl-containing composition is at least one compound selected from the group consisting of aliphatic alcohols, phenols, alcohol-ethylene oxide addition products, aliphatic higher amine-ethylene oxide or propylene oxide addition products, fatty acids, fatty acid-ethylene oxide addition products, glycerol esters, sorbitan esters, glycerol, polyethylene glycols, polypropylene glycols, and polypropylene glycol-ethylene oxide addition products.

* * * * *